Patented Apr. 23, 1929.

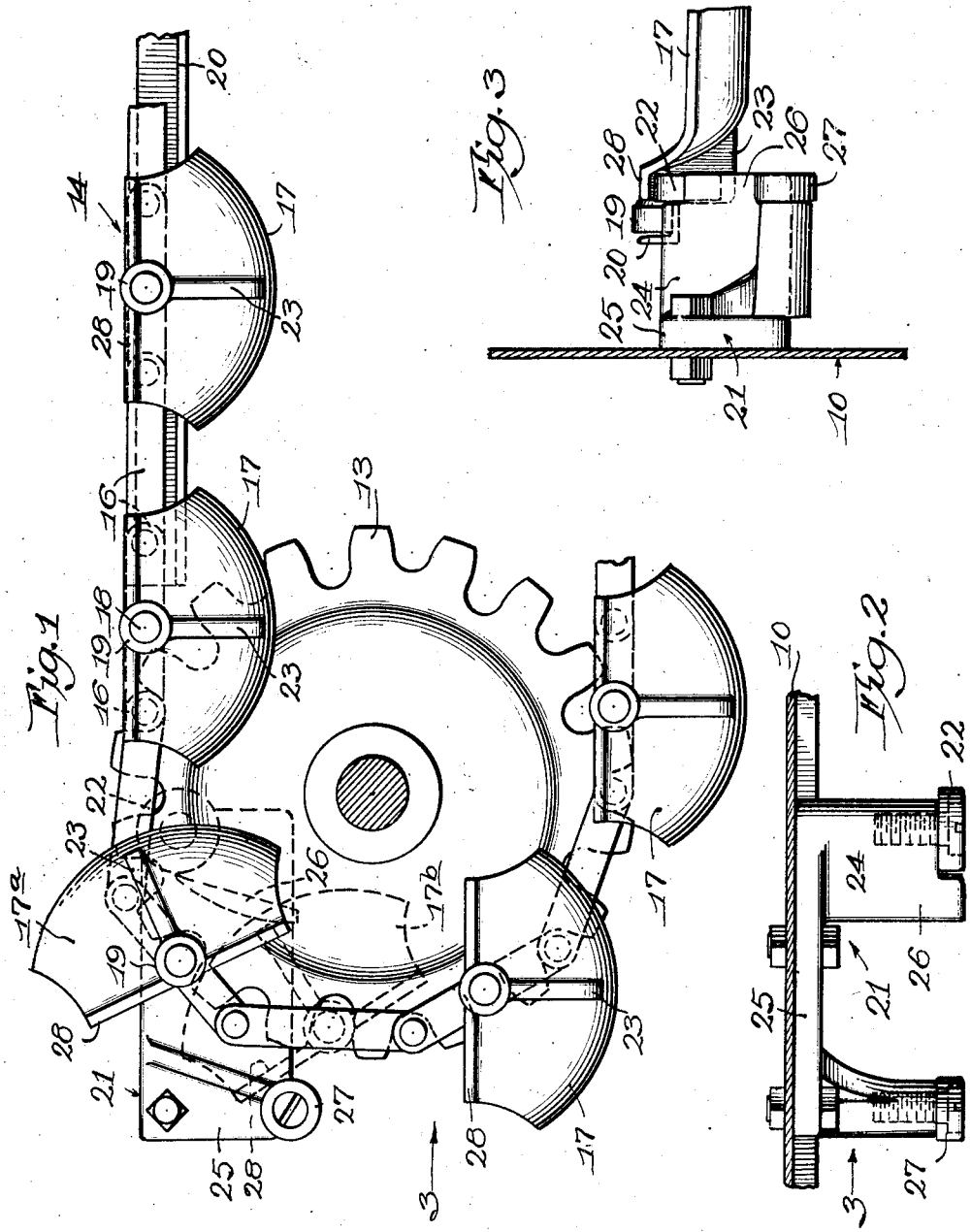

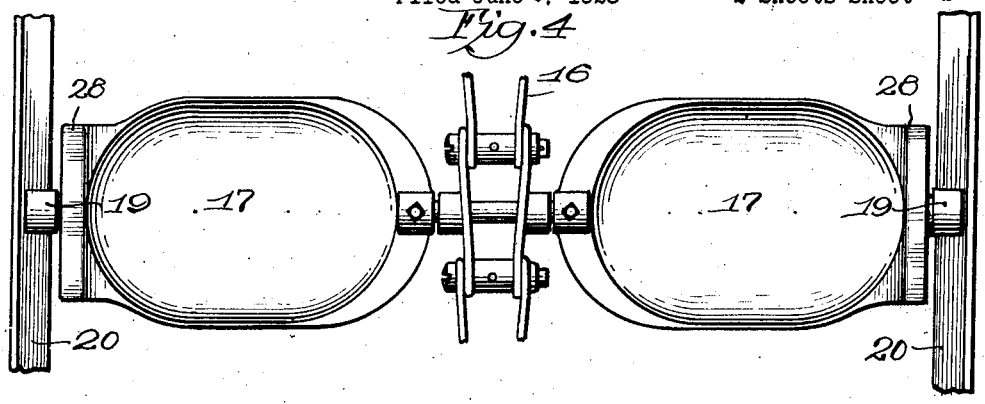
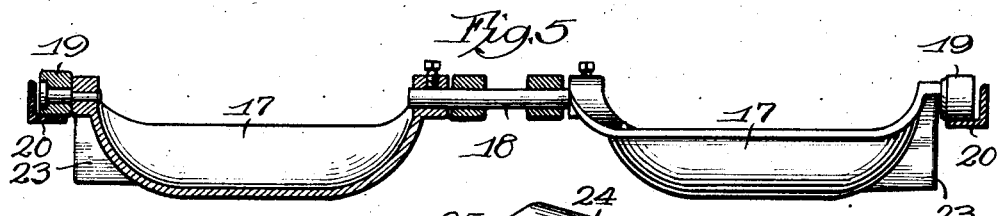
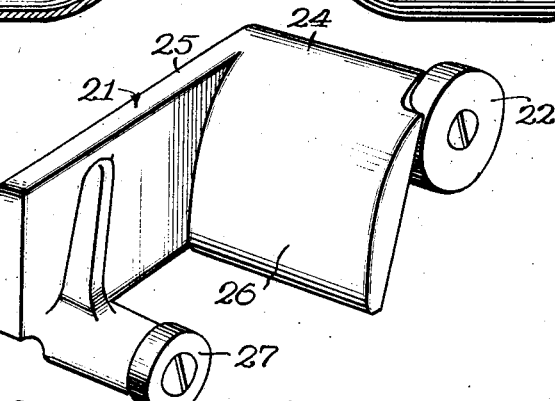
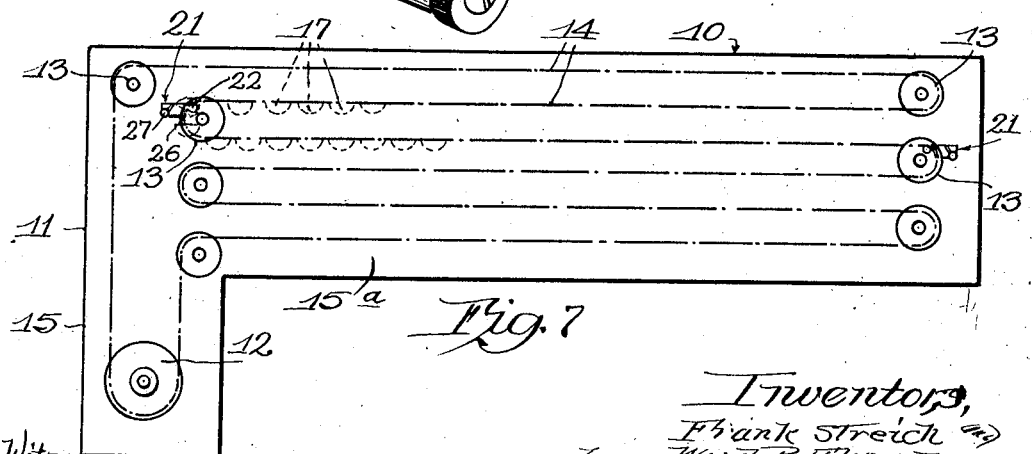

1,710,385

UNITED STATES PATENT OFFICE.

FRANK STREICH AND WARD P. ELWOOD, OF JOLIET, ILLINOIS, ASSIGNORS TO UNION MACHINERY COMPANY, OF JOLIET, ILLINOIS, A CORPORATION OF ILLINOIS.

LOAF-INVERTING MECHANISM FOR PROOFERS.

Application filed June 8, 1928. Serial No. 283,909.

This invention relates to loaf inverting mechanism for proofers, and its principal object is to provide simple and efficient means for inverting the loaves one or more times during their passage through the proofer. It is well known that in the baking industry, the loaves of bread, after having been rounded up, are passed through a proofer, and it has been found desirable, particularly with certain kinds of dough, to turn the loaves over one or more times while contained in the proofer so as to expose all of the sides of the dough to the atmosphere.

Usually the proofer contains an endless conveyor having buckets for conveying the loaves of bread therethrough, which conveyor is trained around sprocket wheels adjacent the ends of the proofer, and in accordance with the present invention, the buckets are inverted while passing around one or more of the sprocket wheels, whereby each loaf of bread may be discharged from one bucket into another therebelow and at the same time inverted so as to bring the side which rested on the bottom of the bucket uppermost.

The invention consists, therefore, in a stationarily located bucket inverting member arranged to engage with each bucket as it passes over a sprocket wheel and thereby invert the bucket, thereby discharging the inverted contents into another bucket. The invention further consists in bucket inverting mechanism adjacent one or more of the sprocket wheels for the conveyor chain of the proofer having means for assisting in righting the buckets after they have been inverted.

The invention further consists in the several novel features of construction, arrangement and combination of parts hereinafter more fully set forth and claimed.

The invention is clearly illustrated in the drawings accompanying this specification in which—

Figure 1 is a side elevation of a fragment of the conveyor, one of the sprocket wheels and the bucket inverting mechanism, illustrating one embodiment of the invention;

Fig. 2 is a plan of one of the bucket inverting members;

Fig. 3 is an end view of the bucket inverting member seen in Fig. 2, looking in the direction of the arrow 3 in Figs. 1 and 2;

Fig. 4 is a plan view of a fragment of the conveyor chain, two of the buckets and certain rails upon which the buckets travel;

Fig. 5 is a view, partly in side elevation and partly in vertical section, of the parts seen in Fig. 4;

Fig. 6 is a perspective view of the bucket inverting member; and

Fig. 7 is a diagrammatic view illustrating the path of travel taken by the conveyor.

Referring first to Fig. 7, the proofer comprises generally a horizontal elongated cabinet 10 having an upright part 11 in which the rounded up lumps of dough are received. Trained around the sprocket wheels 12 and 13 is the conveyor 14 which travels back and forth in the horizontal portion of the cabinet from the receiving end of the cabinet, indicated at 15 to the discharge end of the cabinet, indicated at 15$^a$.

The conveyor may comprise a sprocket conveyor chain 16 to which are connected a multiplicity of buckets 17 usually arranged in pairs, as shown in Fig. 4, each pair being secured upon a pin or rod 18, mounted in a link of the conveyor chain. Upon the outer ends of the buckets are rollers 19 that run on tracks 20 supported by the frame of the cabinet 10. The buckets are supsended from the tracks by the rollers 19 and are capable of tilting on the axis of the rollers 19 and pins 18. Preferably, the buckets are formed with rounded bottoms and the end portions of such bottoms are curved upward so as to form a rounded surface on all of the inner faces of the buckets, whereby no sharp angles will be presented for the dough to enter into. This arrangement facilitates greatly the discharge of the dough from the buckets when inverted or tilted.

Secured to the side walls of the cabinet 10 at places adjacent one or more of the sprocket wheels 13 are bucket inverting members 21, there being as a preference a pair of oppositely disposed bucket inverting members 21 at each place where the buckets are to be inverted. Each bucket inverting member has a part 22, here shown in the form of a roller, arranged to engage with each bucket as it passes over the sprocket wheel and to invert the bucket, thereby discharging the contents thereof into the next adjacent bucket located below and in advance of the inverted one.

In the form of the invention illustrated, each bucket is provided with a horizontal flange 28 and a vertical rib 23 along its outer end, which rib is arranged to engage with the roller 22 as the conveyor chain passes around the sprocket wheel, this position of the bucket being illustrated at 17ª in Fig. 1, where it will be seen that the rib 23 after engaging the roller 22 rides over said roller, thereby bringing the bucket into the inverted or dumping position seen at 17ᵇ in Fig. 1. Conveniently, the roller 22 may be rotatably mounted upon a lug 24 which projects laterally from the body portion 25 of the bucket inverting member 21, and said lug 24 has a depending portion 26 which forms a guide over which the flange 28 and rib 23 travel as the bucket continues in a downward direction around the sprocket wheel, whereby it is held in inverted or dumping position for a substantial interval of time. In front of the guide lug 26 is a part 27, here shown in the form of a roller, which is arranged to encounter the horizontal flange 28 while the bucket is inverted, as at 17ᵇ. The roller 27 and depending lug 26 are spaced apart sufficiently to permit the rib 23 and flange 28 to pass therebetween during the continued downward movement of the conveyor around the sprocket wheel.

In the operation of the bucket inverting mechanism, the rib 23 of each bucket encounters the roller 22 as the bucket begins to pass around the sprocket wheel 13; and the bucket is thereby tilted upon the axis of its support and inverted into the position seen at 17ª in Fig. 1. As the bucket continues to travel around the sprocket wheel, the rib 23 and flange 28 move along the depending guide lug 26, which lug 26 continues to hold the bucket in inverted position, whereby the contents are discharged therefrom and delivered in inverted condition into the next adjacent bucket immediately therebelow.

As the bucket continues its movement around the sprocket wheel in its inverted position, the flange 28 encounters the roller 27 and the bucket is thereupon turned backward upon the axis of its support, whereupon the bucket becomes righted and assumes a position for receiving the loaf from the bucket next following, which at that time is being inverted and its contents are being discharged therefrom. It will be understood in starting the proofer that the buckets are empty and that the first loaded bucket or pair of buckets discharge into an empty bucket or pair of empty buckets.

With the bucket inverting mechanism above described, it is possible to invert the loaves of bread at one or more of the places in the horizontal portion of the cabinet where the conveyor passes around the sprocket wheels. The bucket inverting members may be readily put in place or disconnected from the proofer, so that if it is found that a greater or less number are required, the proper number may be easily and readily installed.

More or less variation of the exact details of construction is possible without departing from the spirit of this invention. We desire, therefore, not to limit ourselves to the exact form of the construction shown and described, but intend, in the following claims, to point out all of the invention disclosed herein.

We claim as new, and desire to secure by Letters Patent:

1. In mechanism of the character described, the combination of a bucket conveyor chain, suspended tiltable buckets pivotally connected to and propelled by said chain, a sprocket wheel over which said chain is trained, and a bucket inverting member located adjacent said sprocket wheel, and having a part arranged to be encountered by said buckets as they pass around the sprocket wheel, whereby said buckets are inverted and the contents thereof discharged in inverted condition into the next adjacent buckets in advance thereof.

2. In mechanism of the character described, the combination of a bucket conveyor chain, suspended tiltable buckets pivotally connected to and propelled by said chain, a sprocket wheel over which said chain is trained, and a bucket inverting member located adjacent said sprocket wheel, and having a roller arranged to be encountered by a vertical rib on the end of each bucket as the bucket passes around said sprocket wheel, whereby said buckets are inverted and the contents thereof discharged in inverted condition into the next adjacent buckets in advance thereof.

3. In mechanism of the character described, the combination of a bucket conveyor chain, suspended tiltable buckets pivotally connected to and propelled by said chain, each bucket having a vertical rib on its outer end, a sprocket wheel over which said chain is trained, and a bucket inverting member located adjacent said sprocket wheel, and having a part arranged to be encountered by said vertical ribs of said buckets as they pass around the sprocket wheel, whereby said buckets are inverted and the contents thereof discharged, in inverted condition, into the next adjacent buckets in advance thereof.

4. In mechanism of the character described, the combination of a bucket conveyor chain, suspended tiltable buckets pivotally connected to and propelled by said chain, each bucket having a vertical rib and a horizontal flange on its outer end, a sprocket wheel over which said chain is trained, and a bucket inverting member located adjacent said sprocket wheel, and having a part arranged to be encountered by the rib of each bucket as it passes over the sprocket wheel, said part having a depending portion forming a guide arranged for engagement with said vertical rib and horizontal flange of the buckets, whereby each bucket is held in dumping position for a substantial interval of time while located above the next adjacent bucket in advance of it.

5. In mechanism of the character described, the combination of a bucket conveyor chain, suspended tiltable buckets connected to and propelled by said chain, each bucket having on one end a vertical rib and a horizontal flange, a sprocket wheel over which said chain is trained, and a bucket inverting member located adjacent said sprocket wheel, said bucket inverting member having a part lying in the path of movement of said vertical ribs of the buckets and adapted to invert the buckets as they pass over said sprocket wheel, said part having a depending guide portion adapted to be engaged by said rib and flange, whereby the bucket is held in inverted position for a substantial interval of time while located over the next adjacent bucket in advance of it.

6. In mechanism of the character described, the combination of a bucket conveyor chain, suspended tiltable buckets connected to and propelled by said chain, each bucket having on one end a vertical rib and a horizontal flange, a sprocket wheel over which said chain is trained, and a bucket inverting member located adjacent said sprocket wheel, said bucket inverting member having a bucket inverting part and a bucket righting part co-operating with said rib and flange to invert and right the buckets as they pass around said sprocket wheel, whereby the loaves are discharged in inverted condition from one bucket to another.

7. In mechanism of the character described, the combination of a bucket conveyor chain, suspended tiltable buckets connected to and propelled by said chain, each bucket having on one end a vertical rib and a horizontal flange, a sprocket wheel over which said chain is trained, and a bucket inverting member located adjacent said sprocket wheel, said bucket inverting member having a roller thereon arranged in the path of movement of the ribs of the buckets, and having a depending guide lug extending from said roller, over which lug said rib and flange travel with the bucket held in inverted condition above a next adjacent one therebelow.

8. In mechanism of the character described, the combination of a bucket conveyor chain, suspended tiltable buckets connected to and propelled by said chain, each bucket having on one end a vertical rib and a horizontal flange, a sprocket wheel over which said chain is trained, and a bucket inverting member located adjacent said sprocket wheel, said bucket inverting member having a bucket inverting roller and a bucket righting roller thereon arranged to engage the rib and flange of each bucket as the bucket passes around the sprocket wheel, whereby the contents are discharged from each bucket in inverted condition into a next adjacent bucket therebelow.

FRANK STREICH.
WARD P. ELWOOD.